(12) United States Patent
Schacht

(10) Patent No.: US 8,047,196 B1
(45) Date of Patent: Nov. 1, 2011

(54) PORTABLE GRILL SYSTEM

(76) Inventor: David Schacht, La Crosse, WI (US)

( * ) Notice: Subject to any disclaimer, the term of this patent is extended or adjusted under 35 U.S.C. 154(b) by 417 days.

(21) Appl. No.: 12/427,447

(22) Filed: Apr. 21, 2009

(51) Int. Cl.
*A47J 33/00* (2006.01)
*A47J 37/07* (2006.01)

(52) U.S. Cl. ............. 126/29; 126/9 R; 126/274; 126/30; 99/25 R; 99/449; 211/173

(58) Field of Classification Search .............. 126/29, 126/9 R, 274; 99/25 R, 449
See application file for complete search history.

(56) References Cited

U.S. PATENT DOCUMENTS

| | | | | |
|---|---|---|---|---|
| 2,828,866 A * | 4/1958 | Jarvis | ............................. | 211/173 |
| 2,965,097 A * | 12/1960 | Clark, Jr. | ......................... | 126/30 |
| 4,146,010 A * | 3/1979 | Manska | .......................... | 126/30 |
| 4,724,753 A * | 2/1988 | Neyman et al. | .................. | 99/339 |
| 4,977,824 A * | 12/1990 | Shinler | ........................... | 99/449 |
| 5,172,628 A * | 12/1992 | Pillsbury et al. | ............. | 99/421 H |
| 7,513,266 B2 * | 4/2009 | Hayashi | .......................... | 135/28 |

* cited by examiner

*Primary Examiner* — Steven B McAllister
*Assistant Examiner* — Nikhil Mashruwala

(57) ABSTRACT

A flexible metallic sheet has a lower edge, parallel side edges and an upper edge. The sheet has spaced long notches. A plurality of rods is provided. Each rod has an interior end with a tab. Each tab is formed with an aperture. Each rod has an exterior end. A primary cap has a circular bottom, a cylindrical side wall and a recess. A ring is provided within the recess. The ring pivotally supports the apertures.

5 Claims, 3 Drawing Sheets

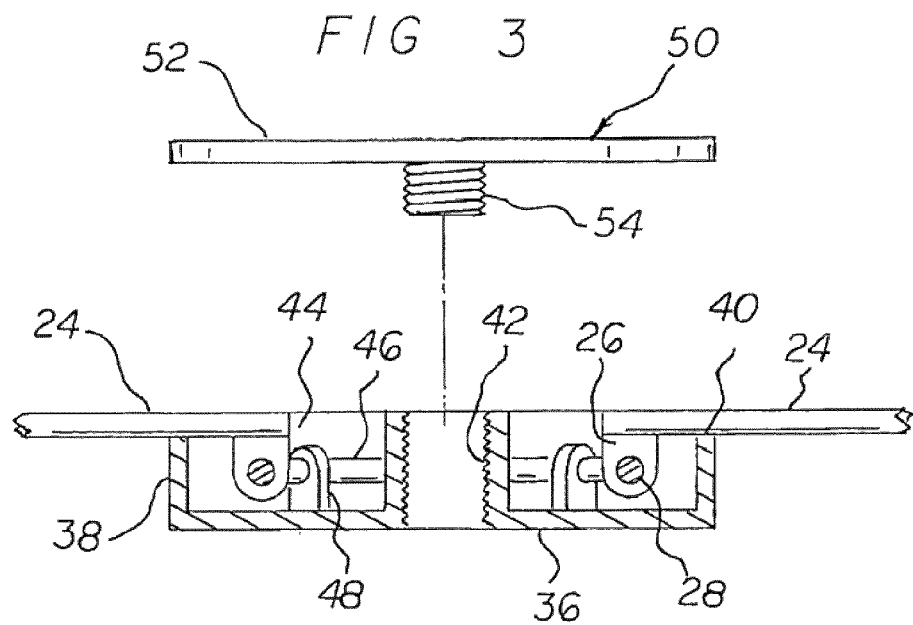
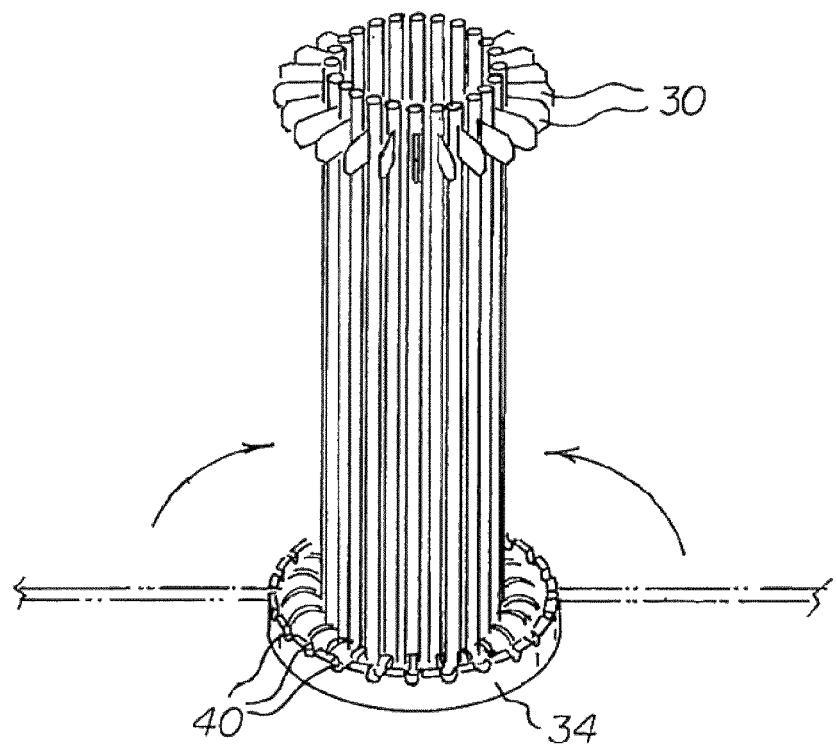

PORTABLE GRILL SYSTEM

BACKGROUND OF THE INVENTION

1. Field of the Invention

The present invention relates to a portable grill system and more particularly pertains to reconfiguring a grill between an expanded operative orientation for cooking purposes and a collapsed inoperative orientation for transporting and storage purposes, the reconfiguring being done in a safe, convenient and economical manner.

2. Description of the Prior Art

The use of grill systems of known designs and configurations is known in the prior art. More specifically, grill systems of known designs and configurations previously devised and utilized for the purpose of transporting and storing grill systems of known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,724,753 issued Feb. 16, 1988 to Neyman relates to a Barbecue Apparatus. U.S. Pat. No. 4,977,824 issued Dec. 18, 1990 to Shinier relates to a Roll-Up Campfire Cooking Grill Assembly. Lastly, U.S. Pat. No. 6,279,468 issued Aug. 28, 2001 to Webster relates to a Roll-Up Grill with integral Fold-Up Support Frame.

While these devices fulfill their respective, particular objectives and requirements, the aforementioned patents do not describe a portable grill system that allows for reconfiguring a grill between an expanded operative orientation for cooking purposes and a collapsed inoperative orientation for transporting and storage purposes, the reconfiguring being done in a safe, convenient and economical manner.

In this respect, the portable grill system according to the present invention substantially departs from the conventional concepts and designs of the prior art, and in doing so provides an apparatus primarily developed for the purpose of reconfiguring a grill between an expanded operative orientation for cooking purposes and a collapsed inoperative orientation for transporting and storage purposes, the reconfiguring being done in a safe, convenient and economical manner.

Therefore, it can be appreciated that there exists a continuing need for a new and improved portable grill system which can be used for reconfiguring a grill between an expanded operative orientation for cooking purposes and a collapsed inoperative orientation for transporting and storage purposes, the reconfiguring being done in a safe, convenient and economical manner. In this regard, the present invention substantially fulfills this need.

SUMMARY OF THE INVENTION

In view of the foregoing disadvantages inherent in the known types of grill systems of known designs and configurations now present in the prior art, the present invention provides an improved portable grill system. As such, the general purpose of the present invention, which will be described subsequently in greater detail, is to provide a new and improved portable grill system and method which has all the advantages of the prior art and none of the disadvantages.

To attain this, the present invention essentially comprises a portable grill system. First provided is a flexible metallic sheet. The sheet is adapted to be scrolled between an expanded operative orientation and a collapsible inoperative orientation. The sheet has a linear lower edge. The sheet has parallel side edges. The sheet also has an upper edge. The sheet has spaced long notches. The long notches are provided parallel with the side edges.

A plurality of rods is provided. Each rod has an interior end. The interior end has a semicircular tab. Each tab is formed with a circular aperture. Each rod has an exterior end. The exterior end has an imperforate tab.

Provided next is a primary cap. The primary cap has a circular bottom. The primary cap has an upwardly extending cylindrical side wall. The side wall has equally spaced short notches. The primary cap has a central collar. The central collar has a threaded bore. In this manner an annular recess is formed. The annular recess is provided between the side wall and the bore. A ring is provided. The ring has a circular cross sectional configuration. Spaced supports are provided. The spaced supports fixedly retain the ring at a central location within the recess. The ring receives and pivotally supports the apertures in the tabs of the rods. In this manner the rods may be moved between the operative orientation and the inoperative orientation. The operative orientation is with the rods in a common plane. The interior ends of the rods are received within the short notches when in the operative orientation. The rods are received within the long notches when in the operative orientation. The rods are parallel with each other when in the inoperative orientation. The exterior ends of the rods are located within the long notches. The tabs are radially interior of and in contact with the sheet when in the operative orientation.

Further provided is a cover. The cover has a circular plate. The cover has a threaded stub. The threaded stub is threadedly received within the threaded bore. In this manner the plate is above and covers the recess when in the operative orientation.

Provided last are two supplemental caps. Each supplemental cap has an imperforate plate. Each supplemental cap has a cylindrical wall. The cylindrical walls are positionable over the upper and lower edges of the sheet, with the primary cap and the rods between the supplemental caps, when in the inoperative orientation. All of the components of the grill system are fabricated of a heat resistant metallic material.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable grill system which has all of the advantages of the prior art grill systems of known designs and configurations and none of the disadvantages.

It is another object of the present invention to provide a new and improved portable grill system which may be easily and efficiently manufactured and marketed.

It is further object of the present invention to provide a new and improved portable grill system which is of durable and reliable constructions.

An even further object of the present invention is to provide a new and improved portable grill system which is susceptible of a low cost of manufacture with regard to both materials and labor, and which accordingly is then susceptible of low prices of sale to the consuming public, thereby making such portable grill system economically available to the buying public.

Even still another object of the present invention is to provide a portable grill system for reconfiguring a grill between an expanded operative orientation for cooking purposes and a collapsed inoperative orientation for transporting and storage purposes, the reconfiguring being done in a safe, convenient and economical manner.

Lastly, it is an object of the present invention to provide a new and improved portable grill system. A flexible metallic sheet has a lower edge, parallel side edges and an upper edge. The sheet has spaced long notches. A plurality of rods is provided. Each rod has an interior end with a tab. Each tab is formed with an aperture. Each rod has an exterior end. A primary cap has a circular bottom, a cylindrical side wall and a recess. A ring is provided within the recess. The ring pivotally supports the apertures.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken along line 3-3 of FIG. 2.

FIG. 4 is a perspective illustration with the system in an inoperative orientation and the sheet removed.

The same reference numerals refer to the same parts throughout the various Figures.

DESCRIPTION OF THE PREFERRED EMBODIMENT

Figure 1:
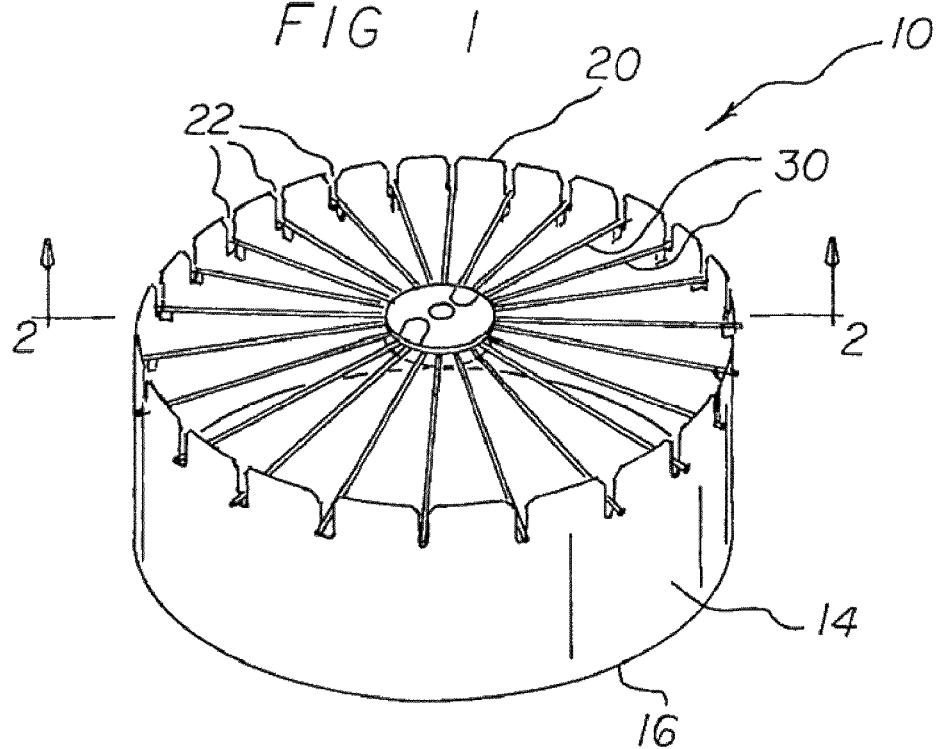
FIG. 1 is a perspective illustration of a portable grill system constructed in accordance with the principles of the present invention shown in the operative orientation.
Figure 2:
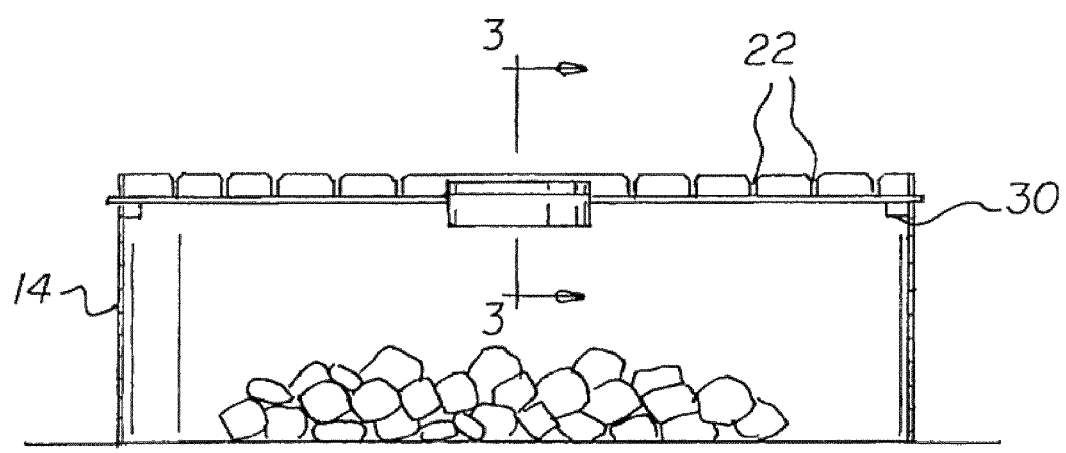
FIG. 2 is a cross sectional view taken along line 2-2 of FIG. 1 showing the system in operation over a burning fuel, wood in the preferred embodiment.
Figure 5:
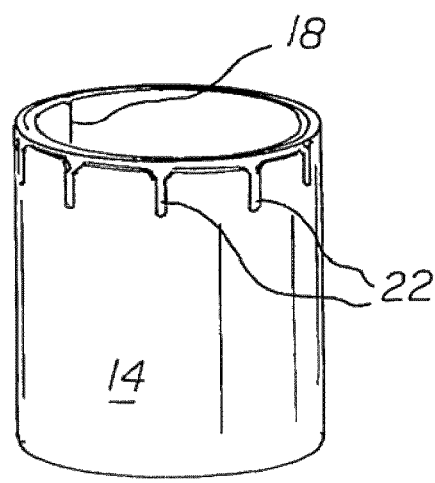
FIG. 5 is a perspective illustration of the sheet in an inoperative orientation.
Figure 6:
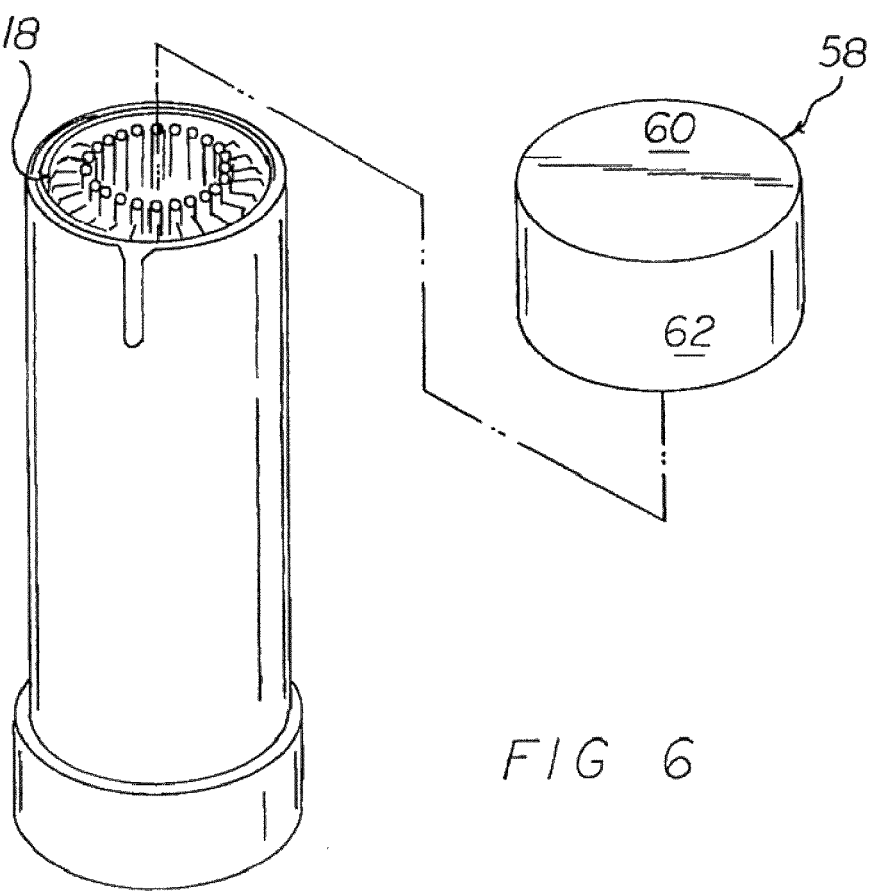
FIG. 6 is an exploded perspective illustration of the system in an inoperative orientation.

With reference now to the drawings, and in particular to FIG. 1 thereof, the preferred embodiment of the new and improved portable grill system embodying the principles and concepts of the present invention and generally designated by the reference numeral 10 will be described.

The present invention, the portable grill system 10 is comprised of a plurality of components. Such components in their broadest context include a flexible metallic sheet, a plurality of rods, and a primary cap. Such components are individually configured and correlated with respect to each other so as to attain the desired objective.

First provided is a flexible metallic sheet 14. The sheet is adapted to be scrolled between an expanded operative orientation and a collapsible inoperative orientation. The sheet has a linear lower edge 16. The sheet has parallel side edges 18. The sheet also has an upper edge 20. The sheet has spaced long notches 22. The long notches are provided parallel with the side edges.

A plurality of rods 24 is provided. Each rod has an interior end. The interior end has a semicircular tab 26. Each tab is formed with a circular aperture 28. Each rod has an exterior end. The exterior end has an imperforate tab 30.

Provided next is a primary cap 34. The primary cap has a circular bottom 36. The primary cap has an upwardly extending cylindrical side wall 38. The side wall has equally spaced short notches 40. The primary cap has a central collar. The central collar has a threaded bore 42. In this manner an annular recess 44 is formed. The annular recess is provided between the side wall and the bore. A ring 46 is provided. The ring has a circular cross sectional configuration. Spaced supports 48 are provided. The spaced supports fixedly retain the ring at a central location within the recess. The ring receives and pivotally supports the apertures in the tabs of the rods. In this manner the rods may be moved between the operative orientation and the inoperative orientation. The operative orientation is with the rods in a common plane. The interior ends of the rods are received within the short notches when in the operative orientation. The rods are received within the long notches when in the operative orientation. The rods are parallel with each other when in the inoperative orientation. The exterior ends of the rods are located within the long notches. The tabs are radially interior of and in contact with the sheet when in the operative orientation Beneath the rods is the fuel. Burning wood is the preferred fuel. Charcoal briquettes and other fuels are also adapted to be used with the present invention.

Further provided is a cover 50. The cover has a circular plate 52. The cover has a threaded stub 54. The threaded stub is threadedly received within the threaded bore. In this manner the plate is above and covers the recess to hold the rods in place when in the operative orientation.

Provided last are two supplemental caps 58. Each supplemental cap has an imperforate plate 60. Each supplemental cap has a cylindrical wall 62. The cylindrical wall is positionable over the upper and lower edges of the sheet, with the primary cap and the rods between the supplemental caps, when in the inoperative orientation. All of the components of the grill system are fabricated of a heat resistant metallic material.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable grill system comprising:
   a flexible metallic sheet having a lower edge and parallel side edges and an upper edge formed with spaced long notches;
   a plurality of rods forming a grilling surface, each rod having an interior end with a tab, each tab being formed with an aperture, each rod having an exterior end; and
   a primary cap having a circular bottom and a cylindrical side wall and a recess, a ring within the recess, the ring pivotally supporting the apertures, wherein the exterior ends of the plurality of rods are supported in the long notches in an operative orientation.

2. The system as set forth in claim 1 and further including two supplemental caps, each supplemental cap having an imperforate plate and a cylindrically extending wall positionable over the upper and lower edges of the sheet when in an inoperative orientation.

3. The system as set forth in claim 1 wherein the ring receives and pivotally supports the apertures in the tabs of the rods for movement between an operative orientation with the rods in a common plane and an inoperative orientation with the rods parallel with each other.

4. The system as set forth in claim 3 wherein the side wall of the primary cap has short notches receiving the interior ends of the rods, the exterior ends of the rods being located within the long notches in contact with the sheet when in the operative orientation.

5. A portable grill system for reconfiguring a grill between an expanded operative orientation for cooking purposes and a collapsed inoperative orientation for transporting and storage purposes, the system comprising, in combination:
   a flexible metallic sheet adapted to be scrolled between an expanded operative orientation and a collapsible inoperative orientation, the sheet having a linear lower edge and parallel side edges and an upper edge formed with spaced long notches parallel with the side edges;
   a plurality of rods, each rod having an interior end with a semicircular tab, each tab formed with a circular aperture, each rod having an exterior end formed with an imperforate tab;
   a primary cap having a circular bottom and an upwardly extending cylindrical side wall, the side wall being formed with equally spaced short notches, the primary cap having a central collar with a threaded bore forming an annular recess between the side wall and the bore, a ring with a circular cross sectional configuration, spaced supports fixedly retaining the ring at a central location within the recess, the ring receiving and pivotally supporting the apertures in the tabs of the rods for movement of the rods between the operative orientation and the inoperative orientation, the operative orientation being with the rods in a common plane, the interior ends of the rods being received within the short notches when in the operative orientation, the rods being received within the long notches when in the operative orientation, the rods being parallel with each other when in the inoperative orientation, the exterior ends of the rods being located within the long notches with the tabs radially interior of and in contact with the sheet when in the operative orientation;
   a cover having a circular plate and a threaded stub threadedly received within the threaded bore whereby the plate is above and covering the recess when in the operative orientation; and
   a pair of supplemental caps, each supplemental cap having an imperforate plate and a cylindrical wall positionable over the upper and lower edges of the sheet, with the primary cap and the rods between the supplemental caps, when in the inoperative orientation, all of the components of the grill system being fabricated of a heat resistant metallic material.

* * * * *